United States Patent [19]

Rabenecker

[11] Patent Number: 4,896,649
[45] Date of Patent: Jan. 30, 1990

[54] DEVICE FOR BREAKING OFF TIPS OF AMPULES

[75] Inventor: Horst Rabenecker, Stockelsdorf, Fed. Rep. of Germany

[73] Assignee: Drägerwerk Aktiengesellscaft, Lübeck, Fed. Rep. of Germany

[21] Appl. No.: 213,378

[22] Filed: Jun. 30, 1988

[30] Foreign Application Priority Data

Aug. 20, 1987 [DE] Fed. Rep. of Germany ....... 3727782

[51] Int. Cl.⁴ .............................................. B28D 1/32
[52] U.S. Cl. .................................... 125/23 R; 30/94; 225/96.5
[58] Field of Search ................ 125/23 R; 30/94, 90.1, 30/92, 93, 111; 225/94, 96, 96.5, 93; 83/11

[56] References Cited

U.S. PATENT DOCUMENTS 4,506,817  3/1985  Parker .................................. 225/93
4,570,838  2/1986  Szemere et al. .................... 225/96.5

Primary Examiner—D. S. Meislin
Assistant Examiner—M. Rachuba
Attorney, Agent, or Firm—McGlew & Tuttle

[57] ABSTRACT

A method and device for the opening of breakable ampules, especially glass test tubes, includes a scoring tool for scratching the end which can be removed by a break-off device. A clean scratching of the ampule end can be executed, producing a smooth fracture by applying an ever constant force exerted on the ampule ends, in order to avoid lengthwise scratches in the body of the ampule from internal stresses. For this, an ampule receiver is provided, into which the ampule can be introduced as far as a stop. It is then rotated while lodged herein with the end of the ampule against the scoring tool. The scratched end of the ampule can be broken off when the ampule is advanced beyond a breaking step.

16 Claims, 1 Drawing Sheet

DEVICE FOR BREAKING OFF TIPS OF AMPULES

BACKGROUND OF THE INVENTION

Field of the Invention

The invention relates, in general, to gas-testing devices and, in particular, to a new and useful device for opening of breakable ampules, especially glass test tubes, the end of which, scratched by a scoring tool, can be removed by a break-off device.

In the most diverse areas of application where, for example, liquids must be removed from ampules, they are scratched at the end in order to open them. This produces a site where the breaking off of the tip should occur.

This also applies to test tubes for detection of gaseous pollutants in air, which must be broken off at both ends prior to use. In the case of a familiar test tube for visualization of air currents, prior to use the end of the glass is passed along a saw, thereby being scored, and the tip is subsequently inserted into an appropriate opening and broken off by bending the tube over (Operating Instructions No. 4351, Drägerwerk AG, Lübeck, W. Germany, June 1986, 4th edition).

In the known device for breaking off the ends of ampules, the fact that the user must manually pass the ampule along the scoring tool, or in the present case a saw, is a disadvantage. This may produce an irregular scratch about the circumferences of the ampule, thereby resulting in an undefined, jagged fracture when subsequently broken off. This must be handled with caution, and the glass fragments produced during the breaking off of the ampule end must be carefully removed. Furthermore, lengthwise scratches may be formed by stress in a glass ampule, weakening its stability. Since the known ampules and test tubes are not used frequently enough for the user to develop a feeling for the necessary manipulations in the scoring and breaking off of the ampule ends over time, the disadvantages recur in each individual instance.

SUMMARY OF THE INVENTION

The present invention improves a glass tube cutting device so that a clean scoring of the ampule end can be carried out, resulting in a smooth break. The breaking process itself is to be done with ever the same force applied to the ends of the ampules, in order to avoid lengthwise scratches in the ampules caused by internal stresses.

The advantage of the invention is essentially the fact that the ampule or test tube can be brought up to the scoring tool in a reliable end reproducible fashion, being assisted by the stop. A simple rotation of the ampule beneath the scoring tool produces a clean, even scratch prior to the breaking off, so that a smooth fracture subsequently results. When the ampule is further advanced beyond the stop, a lateral shearing force is exerted on the end of the ampule, thereby producing a clean break. Thus, lengthwise scratches within the body of the ampule are forestalled, and no glass fragments are produced, except for the broken-off end of the ampule. The scoring is done in reproducible manner, always at the same appropriate site of the ampule end. The user is guided in the manipulations by the device, and need develop no special ability for the execution.

It is advisable to have an outlet in the ampule receiver, from which the broken-off end of the ampule can drop into a collection container. Thus, no loose fragments accrue, and the danger of injury from stray splinters is avoided.

An especially simple configuration of the invention is when the ampule receiver has a single bore, in which the breaking step is fashioned as an inclined plane and the scoring tool itself can be pushed into the bore for the purpose of the scratching and pulled out of the bore for the purpose of breaking off the scored end of the ampule.

In another expedient configuration of the invention, the ampule receiver has two bores. The ampule is inserted into the first receiving bore until it reaches the stop, after which the user produces an even scratch about the end of the ampule by rotating the ampule. The user removes the scratched ampule and introduces it into the second break-off bore past the breaking stop, which breaks off the scratched end of the ampule and drops it into the collection container.

An advantageous complement to the collection container is achieved by a funnel-shaped shell, in which the broken-off ampule ends can be intercepted and dropped through the outlet at the tip of the funnel into the container. This prevents the broken-off ends of the ampule from dropping out of the bores of the ampule receiver when the container is inverted.

In an especially simple manner, the scoring tool comprises a plate, which resiliently projects into the ampule receiver and includes a material scratching the ampule, such as ceramics, hard metal, a diamond pin or an ampule saw.

Accordingly, it is an object of the invention to provide a device for opening breakable ampules such as gas testing tubes which have a cylindrical body tapering to a tip which comprises an ampule receiver having at least one bore of a size to receive the cylindrical body of the ampule and permit its rotation, the bore having a stop to stop the ampule so that the portion adjacent the tip is positioned opposite to a scoring tip which is positionable so that it will score the side of the tube adjacent the tip when the tip is rotated and which further has a deflecting step which, for example, may be formed at the lower end of the bore and which effects breaking of the tip at the score line as the tube is pushed beyond the scoring tube.

A further object of the invention is to provide a device for facilitating the breaking off of the closed end tips of glass gas testing tubes which is simple in design, rugged in construction and economical to manufacture.

A further object of the invention is to provide a method of breaking off tips of glass testing tubes which have ends which taper to a closed tip using a scoring tool which is positioned alongside a bore which has a deflecting step at its lower end and which comprises placing the glass tube into the bore so that its tip is positioned slightly beyond the scoring tool, rotating the tube while the scoring tool is engaged against the surface of the tube just behind the tip so as to scratch the tube, and thereafter moving the tube through a plane in which it contacts a deflecting surface at the end of the bore so as to force the severance of the tip around the score.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention is illustrated.

DESCRIPTION OF THE PREFERRED EMBODIMENTS

Figure 1:
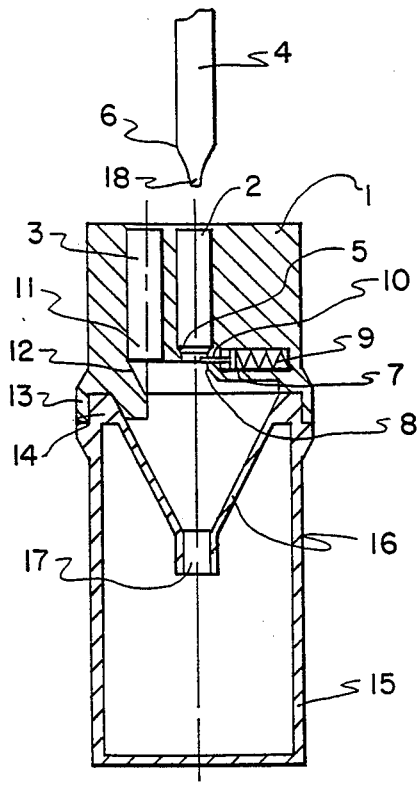
FIG. 1 is a section through an ampule receiver and collection container constructed in accordance with the invention.

Referring to the drawings, in particular, the invention embodied therein comprises a method and device for opening breakable ampules or gas testing tubes 4 which have tapered ends 6 leading to a closed tip 18. In accordance with the method of the invention, the testing tube 4 is positioned so as to align the tip 18 slightly beyond a scoring tube 16 and then rotate the tube so to scratch the tube around its periphery and thereafter the tube is advanced against a deflecting step 12 which causes severance of the tip beyond the scoring line.

FIG. 1 shows an ampule receiver 1 which contains a receiving bore 2 and a breaking bore 3. The ampule 4 can be pushed into the receiving bore 2 up to the scratching stop 5. The scratching stop 5 is fashioned in the shape of a narrowing of the receiving bore 2, on which the shoulder 6 of the ampule rests. The scoring tool 7 is located in the vicinity of the level of the scratching step 5, and it includes a cutter member such as a diamond pin 8 which protrudes into the interior of the receiving bore 2 through an opening 10 under the compressive force of a spring 9.

In parallel with the receiving bore 2 is the breaking bore 3 with an outlet 11, adjoining which is a breaking step 12 in the form of an inclined plane or deflecting surface.

The ampule receiver 1 is connected by a socket joint 13 and 14 to a container 15, the open end of which is provided with a funnel-shaped shell 16, the tip of the funnel having an opening 17 into the interior of the container.

In order to break off the tip 18 of the ampule 4, the ampule is first pushed into the receiving bore 2 up to a scratching stop 5, so that the tip of the ampule 18 lies against the diamond pin 8 of the scoring tool 7. By rotating the ampule 4 several times in this position, a clean and even scratch is produced on the tip of the ampule 18. The spring-action diamond pin 8 during the scoring follows the outer contour of the ampule tip 18 with even and constant pressure. The scratched ampule 4 is then pushed into the breaking bore 3 until the scratched end 18 runs against the inclined plane 12 and is broken off by the bending force along the scratch. The broken-off tip 18 drops into the funnel shell 16 and, through the opening 17, into the container 15.

Figure 2:
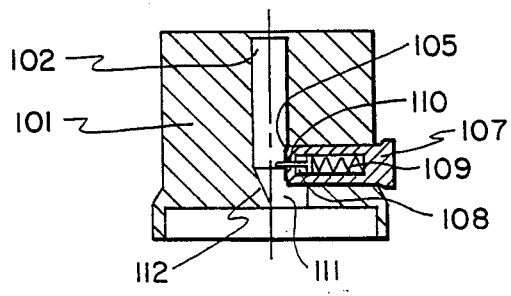
FIG. 2 is a similar view of another embodiment of ampule receiver.

FIG. 2 shows an ampule receiver 101, containing only the receiving bore 102, at the outlet 111 of which is located the breaking step in the form of an inclined plane 112. The scratching stop 105 is formed by a bevel at the breach 110 of the scoring tool 107.

The scoring tool 107 is removably arranged in the form of a bolt in the ampule receiver 101 together with its diamond pin 8 and the spring 9. The bolt 107 can be secured in the ampule receiver 101 by a press fit, as in the depicted example, or it can be fashioned as a threaded pin and screwed into the ampule receiver 101.

With the scoring tool in place, as shown, the ampule 4 is again introduced into the receiving bore 102 as far as the scratching stop 105, and the scoring is done as described for FIG. 1. Then, the scoring tool 17 is retracted from the ampule receiver 101, so that the inserted ampule can be further advanced in the direction of the breaking step 112, upon which the scratched tip 118 is broken off by running against the inclined plane and ejected from the outlet 111 which may discharge into a container similar to container 15.

While a specific embodiment of the invention has been shown and described in detail to illustrate the application of the principals of the invention, it will be understood that the invention may be embodied otherwise without departing from such principles.

What is claimed is:

1. A device for opening breakable tubular ampules having a closed end which may be removed after being scored, comprising:

ampule receiver means for receiving the ampule closed end;

a scoring tool associated with said ampule receiver;

stop means associated with said ampule receiver for engaging the ampule adjacent the ampule closed end and for positioning the ampule closed end relative to the scoring tool to prevent advancement of said ampule in said ampule receiver and to allow rotation of said ampule to allow scoring of said ampule by said scoring tool; and scored ampule receiving means for receiving a scored ampule end being inserted into said scored ampule receiving means in a first axial direction, scored ampule breaking means positioned adjacent said scored ampule, said second ampule breaking means for breaking the scored ampule end upon movement of said scored ampule end into said scored ampule receiving portion a predetermined distance in said first axial direction, whereby the ampule with an open end is removable from said scored ampule receiving end in a second axial direction.

2. A device for opening breakable tubular ampules according to claim 1, wherein said ampule receiver means and said scored ampule receiving means are defined by a single bore, each of said scoring tool and said stop means being movable radially with respect to said single bore and being fixable in a first position for engaging the ampule and fixable in a second position allowing passage of said ampule to said scored ampule breaking means.

3. A device according to 2, wherein said ampule receiver means has an outlet below said bore and including a connection container connected to said receiver around said outlet to receive the broken-off ends of said ampule.

4. A device for opening breakable tubular ampules according to claim 1, wherein said ampule receiver means is defined by a first bore and said second ampule receiving means is defined by a second bore.

5. A device according to claim 4, wherein a scoring tool is mounted adjacent said ampule receiver means so that it is alongside said first bore, the heel of the scoring tool projecting into said bore and biasing means biasing said scoring tool in a direction into said bore.

6. A device according to claim 5, wherein said scoring tool comprises a plate of a material which effects scratching of the end of the ampule and which resiliently projects into said ampule receiving means and extends transversely to the axis of said ampule.

7. A device according to claim 6, wherein said plate comprises a ceramic material.

8. A device according to claim 4, including a receptacle connected to said ampule receiver means said bore, said receptacle having an end with a funnel-shaped opening positioned below the bore.

9. A device for opening breakable tubular ampules according to claim 1, wherein said scored ampule breaking means includes an angled ledge portion for moving a scored ampule end in a radial direction upon moving a scored ampule in said first axial direction within said scored ampule means.

10. A device for opening a breakable tubular ampule according to claim 1, further comprising a container, said container communicating with each of said ampule receiver means and said scored ampule receiving means, broken scored ampule end portions depositing in said container upon breaking the scored ampule end.

11. A device for opening breakable tubular ampules having a closed end which may be removed after being scored, comprising: a housing defining a receiving bore and defining a breaking bore, said receiving bore defining a scratching stop for engaging an ampule adjacent an ampule closed end and for positioning the ampule closed end in a predetermined position; a scoring tool having a scoring tool end protruding into said receiving bore, upon rotation of an ampule with an end positioned in said predetermined position, said scoring tool scoring an end of the ampule; and scored ampule breaking means positioned in said breaking bore for breaking a scored ampule end upon movement of an ampule into said braking bore a predetermined distance in an axial direction.

12. A device for opening breakable tubular ampules according to claim 11, further comprising a container connected to said housing communicating with said receiving bore and breaking bore, thereby scored ampule ends broken from ampules falling from said breaking bore into said container.

13. A device for opening breakable tubular ampules according to claim 11, wherein said scored ampule breaking means includes a scored ampule breaking element protruding into said receiving bore to urge scored ampule ends in a radial direction upon movement of a scored ampule end in an axial direction, thereby breaking an ampule end at a score line.

14. A device for opening breakable tubular ampules having a closed end which may be removed after being scored, comprising: a housing defining an ampule receiver bore; means defining a movable scoring tool insertable and removable from an engagement position within said bore, said scoring tool for scoring an ampule closed end; movable stop means insertable into said bore and removable from said bore, said movable stop means for engaging the ampule adjacent the ampule closed end for positioning the ampule closed end relative to the movable scoring tool; and scored ampule breaking means positioned within said bore, a scored ampule end being insertable into said bore beyond said movable stop and beyond said movable tool in a first axial direction, said scored ampule breaking means for breaking the scored ampule end upon movement of said scored ampule end into said bore, a predetermined distance, in said first axial direction whereby the ampule with an open end is removable from said bore in a second axial direction.

15. A device for opening breakable tubular ampules according to claim 14, wherein said scored ampule breaking means includes a surface portion extending into said bore radially inwardly including an angled portion, said angled portion acting on said second ampule end in a radial direction upon movement of said ampule in an axial direction into said bore.

16. A device for opening breakable tubular ampules according to claim 14, further comprising: a container connected to said housing, said container being in communication with said bore, broken scored ampule ends falling into said container after being broken off by said scored ampule means.

* * * * *